(12) United States Patent
Guo

(10) Patent No.: US 10,443,752 B2
(45) Date of Patent: Oct. 15, 2019

(54) DRIP PROOF OUTLET DIFFUSER FOR A FAUCET

(71) Applicant: Shanghai Kohler Electronics, Ltd., Pundong New Area (CN)

(72) Inventor: Jundong Guo, Shanghai (CN)

(73) Assignee: SHANGHAI KOHLER ELECTRONICS, LTD. (CN)

( * ) Notice: Subject to any disclaimer, the term of this patent is extended or adjusted under 35 U.S.C. 154(b) by 131 days.

(21) Appl. No.: 15/592,728

(22) Filed: May 11, 2017

(65) Prior Publication Data
US 2017/0335985 A1    Nov. 23, 2017

(30) Foreign Application Priority Data

May 20, 2016   (CN) .......................... 2016 1 0339209

(51) Int. Cl.
*F16K 23/00*     (2006.01)
*F16K 15/14*     (2006.01)

(52) U.S. Cl.
CPC ............ *F16K 23/00* (2013.01); *F16K 15/147* (2013.01)

(58) Field of Classification Search
CPC ............................... F16K 23/00; F16K 15/147
USPC ..................... 137/844–855, 512.15
See application file for complete search history.

(56) References Cited

U.S. PATENT DOCUMENTS

| 15,192 | A | * | 6/1856 | Peale | .................... F16K 15/147 137/844 |
| 2,598,002 | A | | 5/1952 | Langdon | |
| 3,422,844 | A | | 1/1969 | Grise | |
| 6,453,940 | B1 | | 9/2002 | Tipton et al. | |
| 2005/0199296 | A1 | * | 9/2005 | Dulin | .................... F16K 15/147 137/614.2 |

FOREIGN PATENT DOCUMENTS

| CN | 201344274 | 11/2009 |
| CN | 101634366 | 1/2010 |
| CN | 204664741 U | 9/2015 |
| EP | 0426223 | 5/1991 |

\* cited by examiner

*Primary Examiner* — P. Macade Nichols
(74) *Attorney, Agent, or Firm* — Foley & Lardner LLP

(57) ABSTRACT

An anti-drip device, such as for use in a faucet or water supply line, that includes a support having at least one water outlet and an elastic lip member disposed inside each water outlet. Each elastic lip member has an open state and a closed state inside the associated water outlet, and each elastic lip member is capable of switching between the open state and the closed state. When the elastic lip member is in the open state, the water outlet is open; and when the elastic lip member is in the closed state, the water outlet is closed.

20 Claims, 5 Drawing Sheets

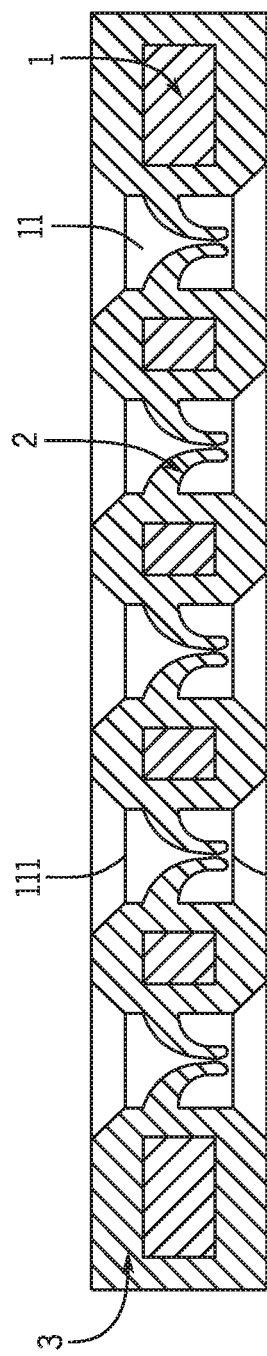
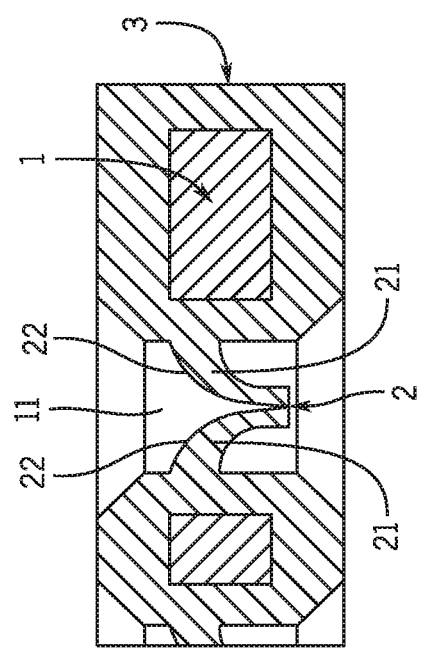
FIG. 4
FIG. 5

DRIP PROOF OUTLET DIFFUSER FOR A FAUCET

CROSS-REFERENCE TO RELATED PATENT APPLICATIONS

The present application claims the benefit of and priority to Chinese Patent Application No. 201610339209.X, filed May 20, 2016, which is incorporated herein by reference in its entirety including the specification, drawings, claims, and abstract.

BACKGROUND

The present application relates to the field of water faucet technologies. More specifically, this application relates to an anti-drip device and a faucet having the anti-drip device.

SUMMARY

At least one embodiment of this application relates to an anti-drip device that overcomes the drawbacks of the other devices by having a simple structure that is easy to operate, can be installed with no need to particularly add a connector or an installation chamber, and can reduce the size of a faucet, and a faucet having the anti-drip device.

At least one embodiment of this application relates to an anti-drip device for installation inside a faucet or a water supply pipe that includes a support having at least one water outlet and an elastic lip member disposed inside each of the water outlets; the elastic lip member having an open state and a closed state inside the water outlet, and capable of switching between the open state and the closed state; when the elastic lip member is in the open state, the water outlet is open; when the elastic lip member is in the closed state, the water outlet is closed.

The elastic lip member may include only one elastic lip; where the elastic lip is disposed in the water outlet; when the elastic lip member is in the open state, at least a part of the region of the elastic lip is separated from the water outlet; and when the elastic lip member is in the closed state, the elastic lip seals the water outlet.

The elastic lip member may include two (or more) elastic lips; where the two elastic lips are disposed opposing each other in the water outlet; when the elastic lip member is in the open state, the two elastic lips are separated from each other; and when the elastic lip member is in the closed state, the two elastic lips are in contact with each other.

The contacting external surfaces of the two elastic lips may be arc-shaped surfaces (e.g., arcuate, curved, bent, etc.). Each of the elastic lips may be arc-shaped.

The support and/or the water outlet may include an inflow side and an outflow side, and the arc-shaped elastic lips may be configured to extend toward the outflow side in a bending manner.

The surface of the support may be covered with a layer of gasket; and the elastic lip member may be part of and/or disposed on the gasket inside the water outlet. For example, the gasket and the elastic lip member may be integrally formed (e.g., a single unitary element of the system).

At least one embodiment of this application relates to a faucet having a faucet body, a water supply pipe, and an anti-drip device as disclosed in this application; where the anti-drip device is installed inside the water supply pipe; and when the elastic lip member in the anti-drip device is in the closed state, the water supply pipeline inside the water supply pipe is completely closed.

At least one embodiment of this application relates to a faucet having a faucet body, a water supply pipe, and an anti-drip device as disclosed in this application; where the anti-drip device is installed inside the faucet body and is positioned between the water outlet of the faucet body and the water outlet of the water supply pipe; and when the elastic lip member in the anti-drip device is in the closed state, the water supply pipeline inside the faucet body is completely closed.

At least one embodiment of this application relates to a faucet having a faucet body, a water supply pipe, and an anti-drip device as disclosed in this application, which is disposed inside the water supply pipe and the faucet body and is positioned between a water outlet of the faucet body and a water outlet of the water supply pipe; where when the elastic lip member in the anti-drip device is in the closed state, the water supply pipelines inside the faucet body and the water supply pipe are completely closed, respectively.

At least one embodiment of this application relates to a body having an outlet; a water supply line located inside the body and having an outlet; and an anti-drip device inside the body between the outlet of the water supply line and the outlet of the body. The anti-drip device includes a support plate having one or more openings therein fluidly connecting the outlet of the body and the outlet of the water supply line; and a gasket disposed on the support plate with an elastic lip member associated with each opening in the support plate. Each elastic lip member is movable between an open state, in which water is able to flow from the outlet of the water supply line to the outlet of the body through the associated opening, and a closed state, in which the elastic lip member seals the associated opening to prevent water from flowing from the outlet of the water supply line to the outlet of the body.

The application of the above technical solutions has the following advantageous effects:

The anti-drip device has a water outlet disposed on the support and an elastic lip member disposed inside the water outlet, and the elastic lip member has the capability of elastic deformation itself for controlling the opening and closing of the water outlet.

When the water channel of the faucet or the water supply pipe is open, the elastic lip member undergoes elastic deformation under the impact of water pressure, then opens the water outlet, and at this moment, the elastic lip member is in the open state, water flows out through the water outlet.

When the water channel of the faucet or the water supply pipe is cut off, there is no longer a powerful water pressure acting on the elastic lip member, the weight of water drops is not sufficient to open the elastic lip member, the elastic lip member is reset by its own elastic deformation capability to seal the water outlet, and at this moment, the elastic lip member is in the closed state to prevent water from dripping out.

Therefore, the anti-drip devices as disclosed in this application have simple structures and convenient operations, and are easy to install, as they can be directly installed inside a faucet and/or a water supply pipe of the faucet, with no need for a special installation chamber or installation connector, thereby reducing the size of the faucet.

The faucet having an anti-drip device as disclosed in this application has good anti-drip effect, lowers the cost, is easy to be assembled, and can reduce the structural size.

BRIEF DESCRIPTION OF THE DRAWINGS

FIG. 4 is a cross-sectional view of the anti-drip device shown in FIG. 2.

FIG. 5 is an enlarged view of a portion of the anti-drip device shown in FIG. 4 having a water outlet equipped with an elastic lip member therein.

DETAILED DESCRIPTION

Figure 1:
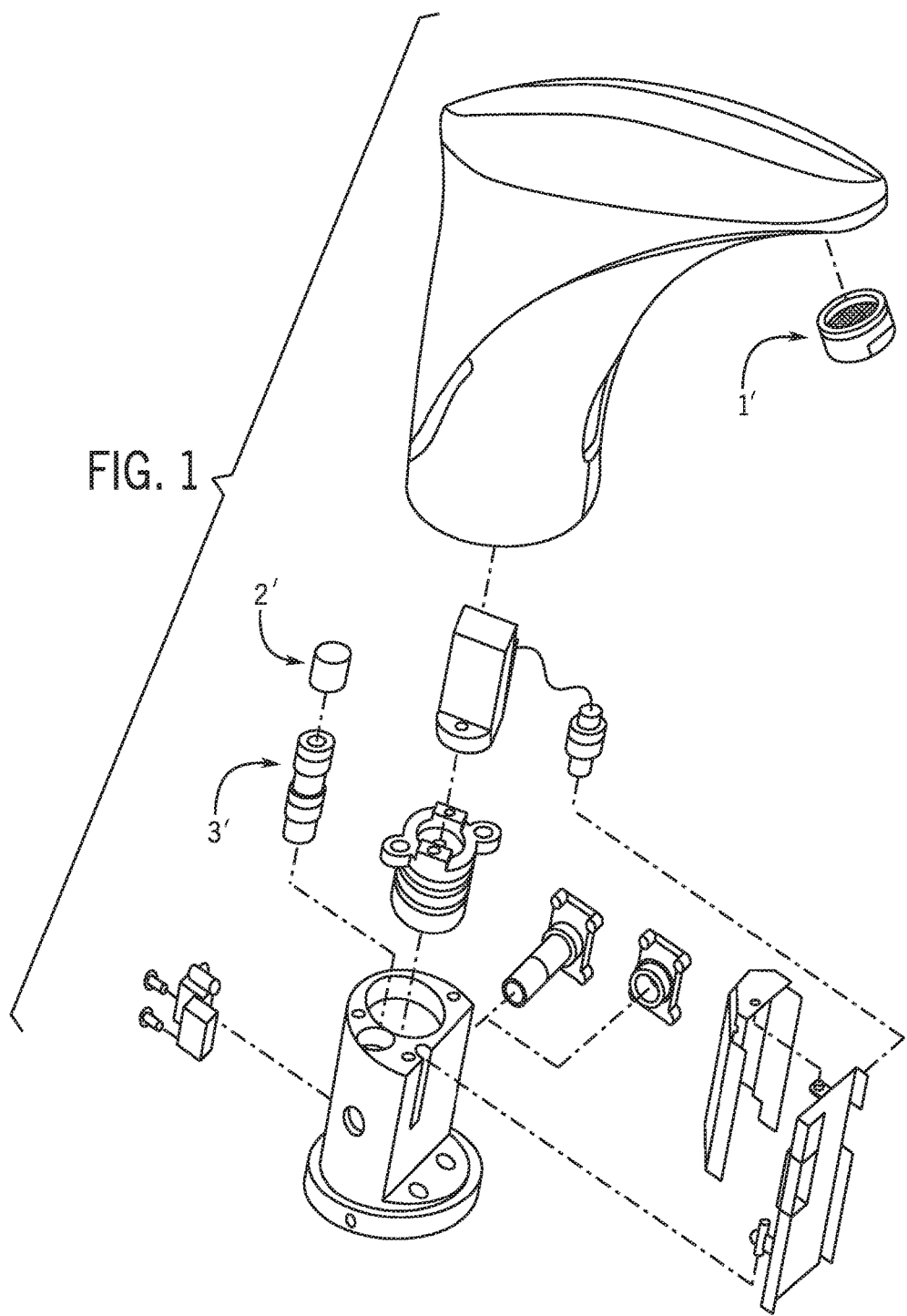
FIG. 1 is an exploded view of the structure of a faucet according to a first embodiment.

Faucets try to employ anti-drip function to prevent water from dripping continuously from a water outlet when the water pathway is cut off. As shown in FIG. 1, the faucet tries to provide anti-drip function by providing a check valve 2' upstream from a bubble former 1' (e.g., an aerator), with the check valve 2' being assembled into the water outlet pipe assembly 3'. To improve the water flow stability, a flow controller is typically added to the rear end of the check valve, or a structure that integrates a flow controller and a check valve is directly used. This approach has the following drawbacks: its parts have high costs, and it is necessary to provide a corresponding installation position inside a faucet, to install these structures, it is typically necessary to add connectors or add a chamber structure, and to increase machining cost, which increases the cost and system complexity.

FIGS. 2-5 illustrate an anti-drip device 100 that is configured for installation inside a faucet or a water supply pipe. The anti-drip device 100 includes a support 1 having at least one water outlet 11 and an elastic lip member 2 disposed inside each water outlet 11. Each elastic lip member 2 is movable between an open state and a closed state inside the associated water outlet 11, and each elastic lip member 2 can switch between the open state and the closed state. When the elastic lip member 2 is in the open state, the associated water outlet 11 is open (e.g., to allow water to flow from an outlet of the faucet), and when the elastic lip member 2 is in the closed state, the associated water outlet 11 is closed (e.g., to prevent water from flowing from the outlet of the faucet). In other words, the anti-drip device 100 is mainly used for installation inside a faucet or a water supply pipe, and when the water channel of the faucet or the water supply pipe is closed, the anti-drip device 100 plays an anti-drip role.

Figure 3:
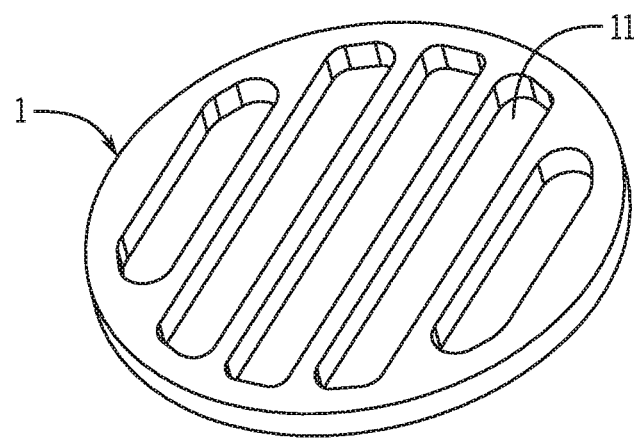
FIG. 3 is a perspective view of a support of an anti-drip device.

More specifically, the anti-drip device 100 includes the support 1 and the elastic lip member 2. The support 1 is used for support and installation of the elastic lip member 2, and as a non-limiting example, the support 1 can include or be made of a substantially rigid material (e.g., a non-elastic polymer material, a metal, a hard material, etc.). The support 1 includes at least one water outlet 11, and may also be provided with a plurality of water outlets 11 as needed for a specific application. As shown in FIG. 3, the support 1 is configured as a plate having a round shape to facilitate matching with a round pipe in a faucet or a water supply pipe. Thus, the outer periphery of the support 1 can be tailored to complement the mating parts of the faucet.

Each water outlet 11 may be elongated (e.g., having a length that is substantially longer than a width), which may advantageously facilitate the installation of the elastic lip member 2 and/or increase the amount of water discharged.

The elastic lip member 2 is a member with the capability of elastic deformation, which can undergo elastic deformation under the action of water pressure or impact by a water flow, thereby opening the water outlet 11 associated with the elastic lip member 2, and when the elastic lip member 2 is not subject to the action of water pressure or impact by a water flow, it is reset (e.g., moves back) to the original position under the action of its own capability of elastic deformation to close the water outlet 11. It should be noted that when the elastic lip member 2 is at the original position, it is in the closed state and the water outlet 11 is closed.

An operating mode of the elastic lip member 2 will now be described. When the water channel of the faucet or the water supply pipe is open, the elastic lip member 2 undergoes elastic deformation under the impact of water pressure, then opens the water outlet 11, and at this moment, the elastic lip member 2 is in the open state allowing water to flow out through the water outlet 11. When the water channel of the faucet or the water supply pipe is cut off, there is no longer a powerful water pressure acting on the elastic lip member 2. As such, the weight of water drops remaining in the water channel is not sufficient to open the elastic lip member 2, allowing the elastic lip member 2 to reset by its own elastic deformation capability to the original position to seal the water outlet 11. In the sealed position, the elastic lip member 2 is in the closed state to prevent water from dripping out of the faucet (e.g., an outlet thereof).

A deformation may occur to the elastic lip member 2 when in the original position or in the closed state, such that the elastic lip member 2 has a pre-tightening force F (e.g., an initial force that seals the water outlet 11 closed). The pre-tightening force F may be tailored according to the specific application in which the anti-drip device is employed. When the elastic lip member 2 is subject to a water flow impact greater than the pre-tightening force F, the elastic lip member 2 is open, and at the same time, the water outlet 11 is open. When the elastic lip member 2 is subject to a water flow impact smaller than the pre-tightening force F, the elastic lip member 2 is closed, and at the same time, the water outlet 11 is closed.

When the water channel of the faucet or the water supply pipe is cut off, there is no subsequent water pressure or water flow that acts on the elastic lip member 2. Therefore, the weight of remaining water drops in the water channel is not sufficient to overcome the pre-tightening force F of the elastic lip member 2, and consequently, the elastic lip member 2 can remain in the closed state to prevent water from dripping out. Therefore, the anti-drip device according to this application has a simple structure and convenient operations, and is easy to install, it can be directly installed inside a faucet and a water supply pipe of the faucet, with no need for a special installation chamber or installation connector, thereby reducing the size of the faucet.

Also shown in FIGS. 2-5, each elastic lip member 2 includes an elastic lip 21. The elastic lip 21 is disposed in the water outlet 11 and is configured such that when the elastic lip member 2 is in the open state, at least a part (e.g., portion, region, section, etc.) of the elastic lip 21 is separated from the water outlet 11, and when the elastic lip member 2 is in the closed state, the elastic lip 21 seals the water outlet 11. The elastic lip member 2 according to a first structure includes only one elastic lip 21 (e.g., a single elastic lip) that is assembled in the water outlet 11.

By way of example, the anti-drip device may include one (or more than one) elongated water outlet and an elongated elastic lip member disposed in each elongated water outlet.

One side of the elastic lip 21 is assembled on one side of the water outlet 11, and at the original position, namely when the elastic lip member 2 is in the closed state, the elastic lip 21 undergoes partial deformation, and the other side of the elastic lip 21 overlaps the other side of the water outlet 11, thereby sealing the water outlet 11.

When impacted by a water flow, at least a part of the region of the elastic lip 21 is separated from the water outlet 11 to open the water outlet 11. For example, the side of the elastic lip 21 that overlaps a side of the water outlet 11 may be separated from the side of the water outlet 11, thereby opening the water outlet 11 for water to flow out.

The elastic lip member 2 shown in FIGS. 2-5 includes two elastic lips 21. The two elastic lips 21 are disposed opposing each other in the water outlet 11, such that when the elastic lip member 2 is in the open state, the two elastic lips 21 are separated from each other. When the elastic lip member 2 is in the closed state, the two elastic lips 21 are in contact with each other.

The elastic lip member 2 according to a second structure includes two (or more) elastic lips 21. The two elastic lips 21 are disposed opposing each other in the water outlet 11. The mutual contact and separation of the two elastic lips 21 are used to control the opening and closing of the water outlet 11. For example, at the original position, namely when the elastic lip member 2 is in the closed state, a deformation may occur to both of the two elastic lips 21, and the two elastic lips 21 contact each other, thereby sealing the water outlet 11 through the two elastic lips 21, such that the water outlet 11 is closed. The manner in which the two elastic lips 21 contact each other may be attached, staggered, touched, and/or overlapped.

When impacted by a water flow, the two elastic lips 21 are separated from each other under the action by the water flow, thereby opening the water outlet 11 to allow water to flow out from the gap between the two elastic lips 21. Such a setup can improve the effect that the elastic lips 21 control the opening and closing of the water outlet 11 and can enable water to flow out from the center of each water outlet 11.

As shown in FIG. 5, the contacting external surfaces 22 of the two elastic lips 21 are arc-shaped surfaces, respectively. By setting the contacting external surfaces 22 of the two elastic lips 21 to be arc-shaped surfaces, it advantageously facilitates the mutual contact of the two elastic lips 21 with no position limit. The two arc-shaped surfaces can be in full contact when contacting at any position, thereby realizing the sealing of the water outlet 11.

As shown in FIGS. 4 and 5, each elastic lip 21 is arc-shaped, which can improve its capability of elastic deformation. Also shown in FIGS. 4 and 5, the gasket 3 and/or water outlet 11 includes an inflow side 111 and an outflow side 112, and the arc-shaped elastic lips 21 extend toward the outflow side 112 in a bending manner, such as from a first end, which is fixed (e.g., relative to the support 1) to portion of the gasket 3 coupled to a portion of the support 1 (e.g., a cross member), to a second end, which is able to move freely relative to the first end.

The inflow side 111 is the side at which water flows into the water outlet 11. The inflow side 111 is at an upstream position in the direction of water flow, and may also be referred to as an upstream side.

The outflow side 112 is the side at which water flows out of the water outlet 11. The outflow side 112 is at a downstream position in the direction of water flow, and may also be referred to as a downstream side. The inflow side 111 and the outflow side 112 are preferably disposed opposing each other.

By setting the arc-shaped elastic lips 21 to extend toward the outflow side 112 in a bending manner (e.g., curved, arcuate, etc.), at least the following two advantageous effects can be achieved. First, after water flows into the water outlet 11, the direction of its force is toward the outflow side 112, while the arc-shaped elastic lips 21 also extend toward the outflow side 112 in a bending manner, and when it receives the water flow that applies a pressure toward the outflow side 112, deformation thereof is facilitated to open the water outlet 11. Second, since the arc-shaped elastic lips 21 extend toward the outflow side 112 in a bending manner, and the external surfaces thereof facing the inflow side 111 are arc-shaped, the contact area between the water flow and the arc-shaped elastic lips 21 are increased, and the pressure applied by the water flow on the elastic lips 21 is enhanced, which facilitates the deformation of the elastic lips 21 to open the water outlet 11.

Figure 2:
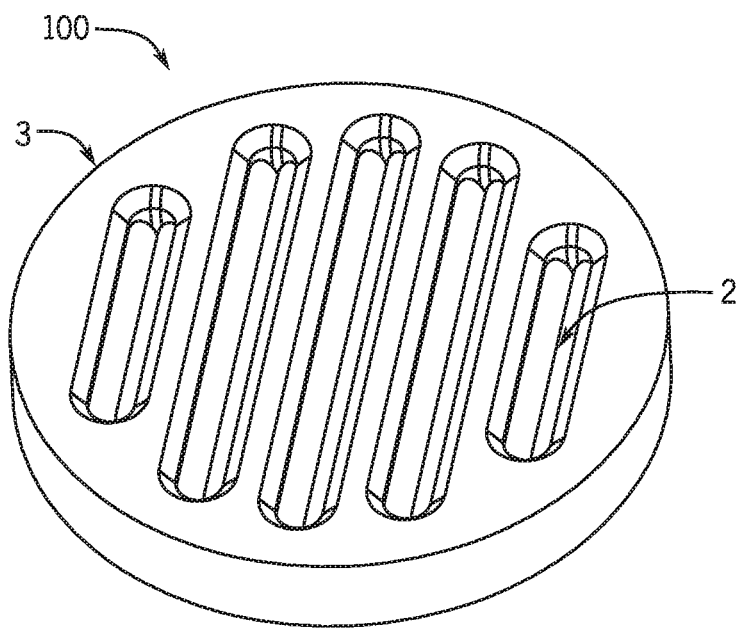
FIG. 2 is a perspective view of an anti-drip device, according to this application.

As shown in FIGS. 2, 4 and 5, the surface of the support 1 is covered with a layer of gasket 3, and the elastic lip member 2 is disposed on the gasket 3 inside the water outlet 11. Each elastic lip member 2 may be integrally formed with the gasket 3, such as including an elastic material.

The entire surface of the support 1, including its upper and lower surfaces, side faces, and the surface of the water outlet may be covered with a layer of gasket 3. For example, the elastic gasket 3 may be over-molded onto the support 1. The elastic lip member 2 is disposed on the gasket 3, and the elastic lip member 2 is positioned inside the water outlet 11. By setting the gasket 3, there is no need to separately provide a gasket when the anti-drip device 100 is assembled in a faucet or a water supply pipe, which automatically realizes pipeline sealing, improves the sealing effect, and facilitates installation.

As noted, the gasket 3 and the elastic lip member 2 may be integrally formed, which facilitates manufacturing, improves the structural strength, and extends the service life.

The gasket 3 and the elastic lip member 2 may be made of or include the same material. For example, both may be made of a rubber material or other plastic material that has elastic properties.

Figure 6:
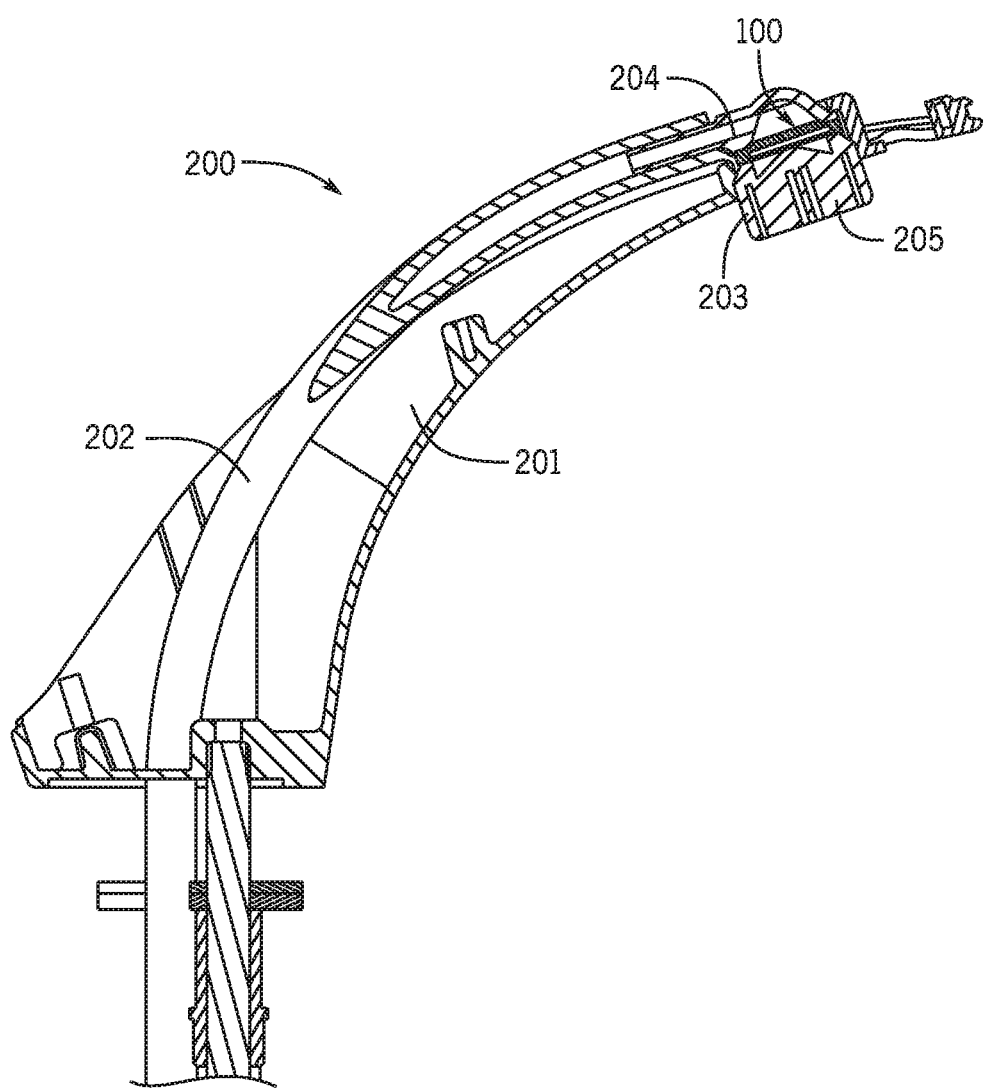
FIG. 6 is a side cross-sectional view of a faucet that includes an anti-drip device, according to this application.
Figure 7:
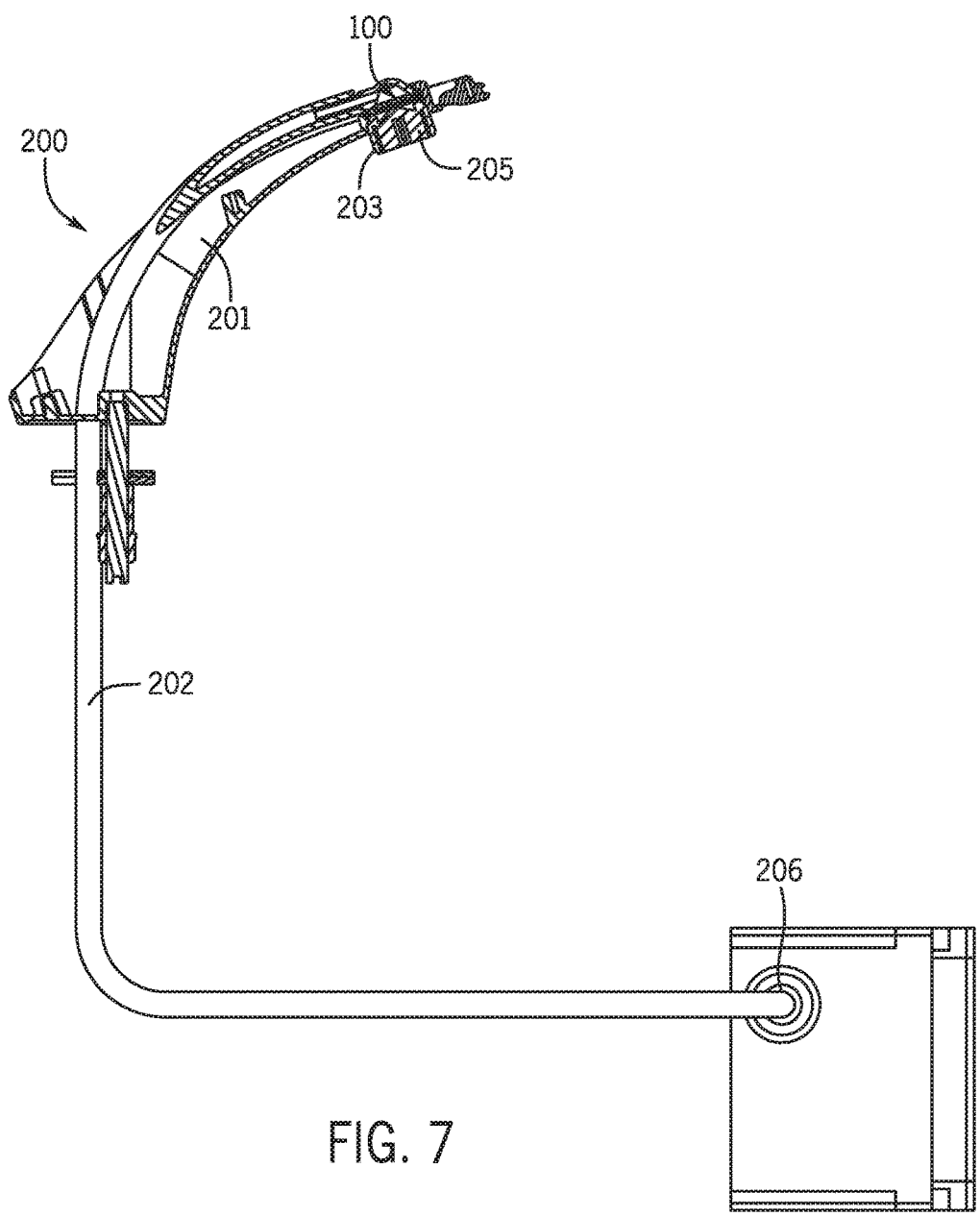
FIG. 7 is a side cross-sectional view of the faucet shown in FIG. 6 fluidly connected to a water inlet valve through a water supply pipe.

FIGS. 6 and 7 illustrate a faucet 200 according to one embodiment of this application. The faucet 200 includes a faucet body 201, a water supply pipe 202, and an anti-drip device 100 according to any one disclosed in this application. The anti-drip device 100 may be installed inside the water supply pipe 202; such that when the elastic lip member 2 in the anti-drip device 100 is in the closed state, the water supply pipeline inside the water supply pipe 202 is completely closed.

The structure, construction and principle of the anti-drip device 100 have been described in detail above, which will not be repeated herein.

One end of the water supply pipe 202 is connected to a water inlet valve 206, and the other end thereof is disposed inside the faucet body 201, which plays a role of water supply.

With the anti-drip device 100 installed inside the water supply pipe 202, the water supply pipeline inside the water supply pipe 202 is completely closed when the water inlet valve of the water supply pipe 202 is closed and the elastic lip member 2 is in the closed state, which can achieve the anti-drip effect.

The anti-drip device 100 may be installed at any position inside the water supply pipe 202, leading to flexible installation.

Also shown in FIGS. 6 and 7, the faucet 200 includes a faucet body 201, a water supply pipe 202, and any anti-drip device disclosed in this application.

The anti-drip device 100 may be installed inside the faucet body 201 and may be positioned between the water outlet 203 of the faucet body 201 and the water outlet 204 of the water supply pipe 202. When the elastic lip member 2 in the anti-drip device 100 is in the closed state, the water supply pipeline inside the faucet body 201 is completely closed. With the anti-drip device 100 installed inside the faucet body 201 and specifically between the water outlet 203 of the faucet body 201 and the water outlet 204 of the water supply pipe 202, the water supply pipeline inside the faucet body 201 is completely closed when the water inlet valve of the faucet is closed and the elastic lip member 2 is in the closed state, which can achieve the anti-drip effect.

A bubble former 205 (e.g., an aerator) may be provided inside the water outlet 203. If the bubble former 205 is provided, the anti-drip device 100 can be assembled between the bubble former 205 and the water outlet 204, which can achieve a better anti-drip effect.

Also shown in FIGS. 6 and 7, the faucet 200 includes a faucet body 201, a water supply pipe 202, and any anti-drip device 100 disclosed herein and disposed inside the water supply pipe 202. The anti-drip device 100 may also be disposed inside the faucet body 201, with the anti-drip device 100 positioned between the water outlet 203 of the faucet body 201 and the water outlet 204 of the water supply pipe 202.

When the elastic lip member 2 in the anti-drip device 100 is in the closed state, the water supply pipelines inside the faucet body 201 and the water supply pipe 202 are completely closed, respectively. With the anti-drip device 100 provided in both the water supply pipe 202 and the faucet body 201, the water supply pipe 202 and the faucet body 201 are controlled by a main water inlet valve. The water supply pipelines inside the faucet body 201 and the water supply pipe 202 are completely closed, respectively, when the main water inlet valve is closed and the elastic lip member 2 is in the closed state. This arrangement may advantageously achieve the maximum anti-drip effect.

Since the anti-drip device 100 can be directly installed inside the faucet body 201 and/or the water supply pipe 202, there advantageously is no need for a special installation chamber or installation connector. Further, this arrangement also advantageously allows for the size of the faucet to be reduced.

Therefore, the faucet having an anti-drip device according to the present application provides several advantages, some of which are providing good anti-drip effect, lowering the cost, making assembly easier, and reducing the structural size.

The above technical solutions may be combined as needed to achieve the desired technical effect. While only the principle and preferred embodiments may be described above, it should be noted that, to those skilled in the art, a number of other variations may be further made on the basis of the principle of the present application, all of which shall be encompassed by the scope of the present application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure. It should be noted that the terms, "front", "rear", "left", "right", "up" and "down", used in the description refer to the directions in the accompanying drawings, and the terms, "inner" and "outer", refer to directions toward or away from the geometric center of a specific part, respectively.

The construction and arrangement of the elements of the anti-drip devices as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., support, gasket, lip member, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. An anti-drip device for installation inside a faucet or a water supply pipe, comprising:
 a support plate having a plurality of water outlets fluidly connecting an inlet and an outlet of the faucet or the water supply pipe, wherein each water outlet is spaced apart from each adjacent water outlet; and
 a gasket located adjacent the support plate and having a plurality of elastic lip members with at least one elastic lip member disposed inside each water outlet of the support plate;
 wherein each elastic lip member has an open state, in which the associated water outlet is open, and a closed state, in which the associated water outlet is closed; and
 wherein each elastic lip member is capable of switching between the open state and the closed state.

2. The anti-drip device of claim 1, wherein each elastic lip member comprises a single elastic lip that is disposed inside the associated water outlet; wherein in the open state of the elastic lip member, at least a part of the associated elastic lip is separated from the associated water outlet; and wherein in the closed state of the elastic lip member, the associated elastic lip seals the associated water outlet.

3. The anti-drip device of claim 1, wherein each elastic lip member comprises two elastic lips that are disposed opposing each other inside the water outlet; wherein in the open state of the elastic lip member, the associated two elastic lips are separated from each other; and wherein in the closed state of the elastic lip member, the two elastic lips contact one another to seal the associated water outlet.

4. The anti-drip device of claim 3, wherein each of the two elastic lips comprises a contact surface that contacts the contact surface of the other elastic lip in the closed state of the elastic lip member, and each contact surface is arc-shaped.

5. The anti-drip device of claim 4, wherein each elastic lip is arc-shaped from a fixed end to a free end.

6. The anti-drip device of claim 5, wherein each water outlet comprises an inflow side and an outflow side, and each arc-shaped elastic lip extends from the fixed end, which is proximate the inflow side, toward the free end, which is proximate the outflow side, in a bending manner.

7. A faucet comprising the anti-drip device of claim 6, a faucet body, and a water supply pipe; wherein the anti-drip device is installed inside the water supply pipe; and wherein in the closed state of the elastic lip member, the water supply pipe is completely closed to prevent water flow to a water outlet of the faucet body.

8. A faucet comprising the anti-drip device of claim 6, a faucet body, and a water supply pipe inside the faucet body; wherein the anti-drip device is installed inside the faucet body and is positioned between a water outlet of the faucet body and a water outlet of the water supply pipe; and wherein in the closed state of the elastic lip member, the water supply pipe is completely closed to prevent water flow to the water outlet of the faucet body.

9. A faucet comprising the anti-drip device of claim 6, a faucet body, and a water supply pipe inside the faucet body; wherein the anti-drip device is disposed inside the water supply pipe and the faucet body and is positioned between a water outlet of the faucet body and a water outlet of the water supply pipe; and wherein each elastic lip member is in the closed state, the water supply pipe is completely closed to prevent water flow to the water outlet of the faucet body.

10. An anti-drip device for installation inside a faucet or a water supply pipe, comprising:
 a support having at least one water outlet; and
 an elastic lip member disposed inside each water outlet, wherein each elastic lip member has an open state, in which the associated water outlet is open, and a closed state, in which the associated water outlet is closed, and each elastic lip member is capable of switching between the open state and the closed state
 wherein a surface of the support is covered with a layer of gasket, and each elastic lip member is disposed on the layer of gasket inside the associated water outlet.

11. The anti-drip device of claim 10, wherein each elastic lip member is integrally formed with the layer of gasket.

12. A faucet, comprising:
 a body having an outlet;
 a water supply line located inside the body and having an outlet; and
 an anti-drip device inside the body between the outlet of the water supply line and the outlet of the body, the anti-drip device comprising:
  a support plate having one or more openings therein fluidly connecting the outlet of the body and the outlet of the water supply line; and
  a gasket disposed on the support plate with an elastic lip member associated with each opening in the support plate;
 wherein each elastic lip member is movable between an open state, in which water is able to flow from the outlet of the water supply line to the outlet of the body through the associated opening, and a closed state, in which the elastic lip member seals the associated opening to prevent water from flowing from the outlet of the water supply line to the outlet of the body.

13. The faucet of claim 12, wherein the support plate has a plurality of elongated openings fluidly connecting the outlet of the body and the outlet of the water supply line.

14. The faucet of claim 13, wherein the plurality of elongated openings are arranged side by side and in parallel to one another with each pair of adjacent openings separated by a cross member of the support plate.

15. The faucet of claim 14, wherein the gasket is disposed on each cross member with an elastic lip member extending from each side of two opposing sides of two adjacent cross members into the associated opening between the two adjacent cross members.

16. The faucet of claim 15, wherein the support plate comprises a non-elastic material and each elastic lip member comprises an arc shaped body extending from a first end, which is fixed to a wall of the gasket coupled to the associated cross member, to a second end, which is free to move relative to the first end between the open and closed states.

17. The faucet of claim 16, wherein the support plate has an inflow side, which is fluidly connected with the outlet of the water supply line, and an outflow side, which is fluidly connected with the outlet of the body of the faucet, and wherein each elastic lip member extends away from the inflow side toward the outflow side moving along the arc shaped body from the first end toward the second end.

18. The faucet of claim 12, wherein the gasket comprises two elastic lip members associated with each opening in the support plate, the first of the two elastic lip members extends from a first side of the support plate defining the opening from a first end fixed to the first side to a second end freely movable, and the second of the two elastic lip members extends from a second side of the support plate defining the opening from a first end fixed to the second side to a second end freely movable.

19. The faucet of claim 18, wherein the first elastic lip member includes a first contact surface and the second elastic lip member includes a second contact surface, the first and second contact surfaces are separated in the open state, and the first and second contact surfaces are in contact in the closed state.

20. The faucet of claim 19, wherein the first side of the support plate opposes the second side of the support plate, and the support plate comprises a non-elastic material.

\* \* \* \* \*